United States Patent [19]
Smith

[11] 3,771,833
[45] Nov. 13, 1973

[54] DEMOUNTABLE SOLID TIRE WHEEL ASSEMBLY

[76] Inventor: Cornelius W. Smith, 356 Fisher Rd., Crosse Pointe Farms, Mich. 48230

[22] Filed: Oct. 12, 1971

[21] Appl. No.: 188,519

Related U.S. Application Data

[63] Continuation of Ser. No. 878,630, Nov. 21, 1969, abandoned.

[52] U.S. Cl. ............................... 301/11 R, 152/47
[51] Int. Cl. ........................ B60b 9/12, B60b 23/02
[58] Field of Search ................... 301/11, 18, 23, 19, 301/22; 152/47, 50

[56] References Cited
UNITED STATES PATENTS

| | | | |
|---|---|---|---|
| 1,223,788 | 4/1917 | Hauschild | 301/11 R |
| 1,336,452 | 4/1920 | Wheelock | 301/23 |
| 1,500,317 | 7/1924 | Hayes | 152/47 |
| 1,519,683 | 12/1924 | Jardine | 301/22 |
| 1,725,733 | 8/1929 | Harter | 301/11 R X |
| 2,860,683 | 11/1958 | Smith | 301/11 R X |
| 3,437,383 | 4/1969 | Randour | 301/22 |

Primary Examiner—Richard J. Johnson
Attorney—Barnes, Kisselie, Raisch & Choate

[57] ABSTRACT

A standard solid tire for an industrial vehicle releasably mounted on a wheel by applying pressure to a ring of an elastic material entrapped therebetween. The elastic ring is urged into firm frictional engagement with the wheel and tire thereby securing or locking them together.

7 Claims, 6 Drawing Figures

PATENTED NOV 13 1973 3,771,833

INVENTOR
CORNELIUS W. SMITH

BY
Barnes, Kisselle, Raisch & Choate
ATTORNEYS

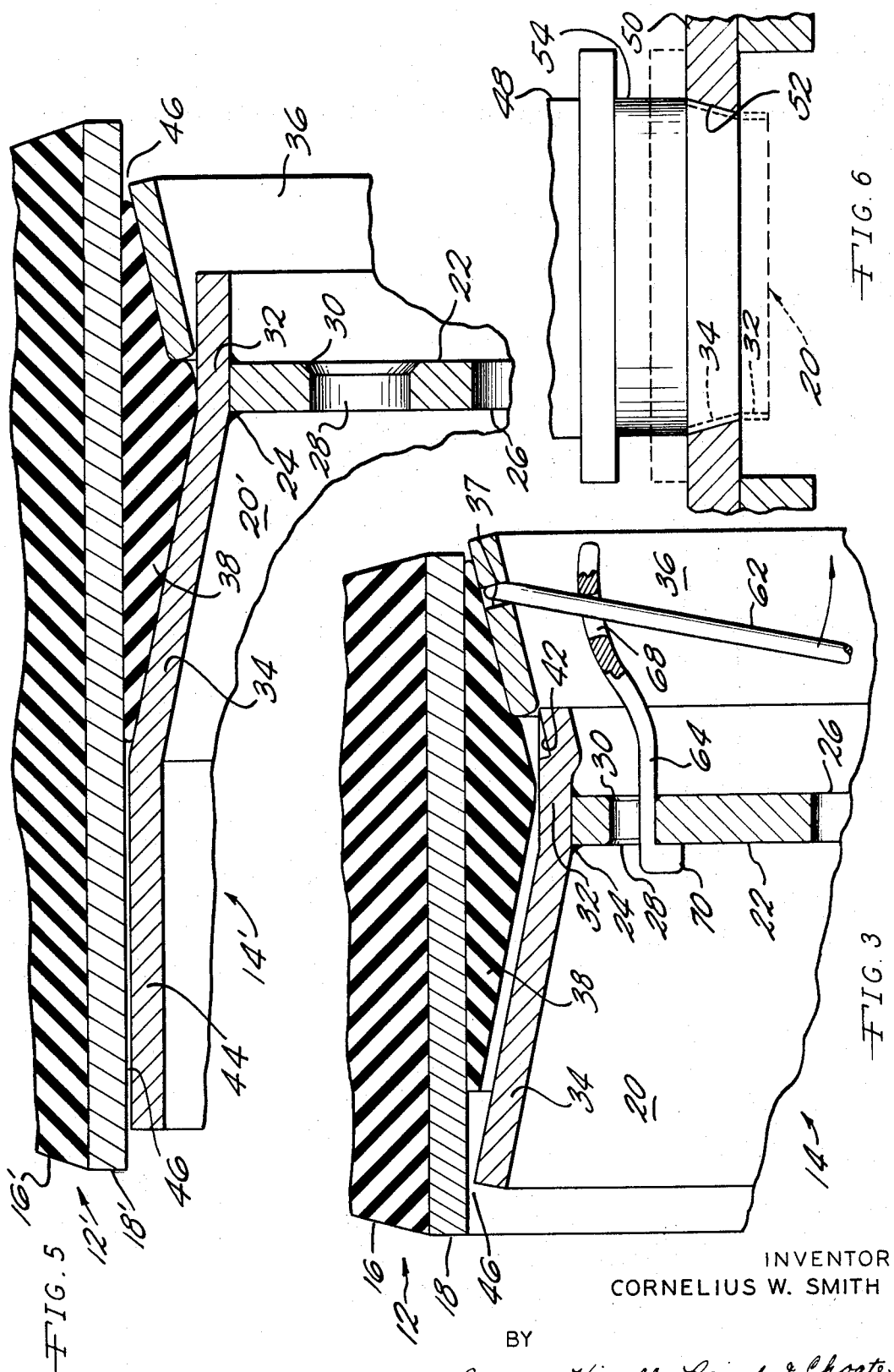

3,771,833

DEMOUNTABLE SOLID TIRE WHEEL ASSEMBLY

This is a continuation of application Ser. No. 878,630, filed Nov. 21, 1969, now abandoned.

This invention relates to tire and wheel assemblies for industrial vehicles and more particularly to the mounting of solid tires on wheels.

Tires most commonly used on industrial vehicles such as forklift and pallet trucks are solid rubber and have a cylindrical metal band bonded to the rubber around the inner periphery of the tire. These standard tires are designed to be demountably applied to wheels by pressing them over the wheel rims. The tires and wheels are dimensioned to require a load of at least about 25 tons to apply a tire to or remove it from a wheel. Such loads require the use of special presses. These special presses are expensive and primarily useful only in pressing tires on and off. Small plants and warehouses which have only a few of these indurstrial vehicles usually do not have the equipment required to mount and demount such tires on wheels. These small businesses must send their wheels to outside shops to have the tires mounted and demounted. This results in an additional maintenance expense and considerable downtime during which the industrial vehicle cannot be used because properly mounted tires are not available. This also results in partially worn tires being discarded before the usable tread has been consumed to facilitate sending the tires to an outside shop when the vehicles are not normally in use.

In order to overcome these problems tires and wheels which do not require presses and other special equipment for mounting and demounting have been previously proposed. However, such designs have invariably used specially contoured and shaped tires and wheels. These special designs for industrial vehicles are expensive compared to standard tires and wheels and cannot be interchanged and used with standard tires.

Objects of this invention are (1) to provide a demountable tire and wheel assembly which uses a standard solid tire and hence is of simple design and economical manufacture and assembly, (2) to reduce the maintenance expense and industrial vehicle downtime heretofore associated with the use of standard solid tires, (3) to eliminate the necessity of using presses and other special equipment in mounting and demounting standard solid tires, and (4) to provide a way by which standard solid tires can be readily mounted and demounted at the site by unskilled labor using hand tools.

These and other objects, features and advantages of this invention will be apparent in reading the following detailed description and examining the accompanying drawings in which:

FIG. 3 is a sectional view similar to FIG. 2 showing some of the component parts of the wheel in loose assembly just prior to securing the solid tire to the wheel.

FIG. 5 is a cross-sectional view similar to FIG. 2 illustrating a modified form of a rim of the wheel.

FIG. 6 is a semi-schematic view partially in section of a press and die for forming the rim of a wheel.

In the method of this invention a solid tire with an annular metal band for an industrial vehicle is mounted on a wheel by inserting the wheel within the metal band and inserting a separate ring of an elastic and resilient material between the wheel and the band. The ring of elastic material is compressed to urge it into firm frictional engagement with both the band of the tire and the wheel thereby locking the tire and the wheel together.

Figure 1:
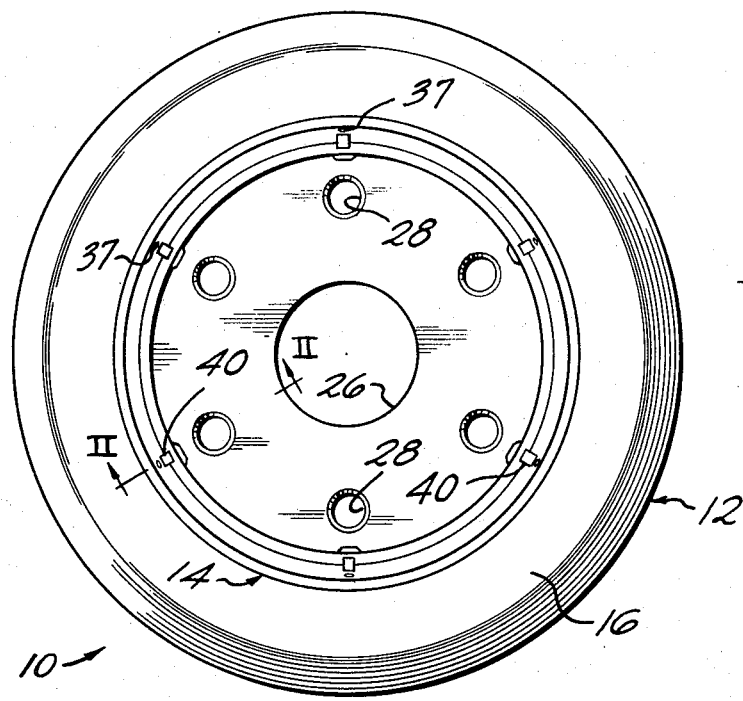
FIG. 1 is an elevational view of a standard solid tire mounted on a wheel in accordance with this invention.

FIG. 1 illustrates a solid tire and wheel assembly designated generally as 10 with a standard solid tire 12 mounted on a wheel 14 in accordance with this invention.

Figure 2:
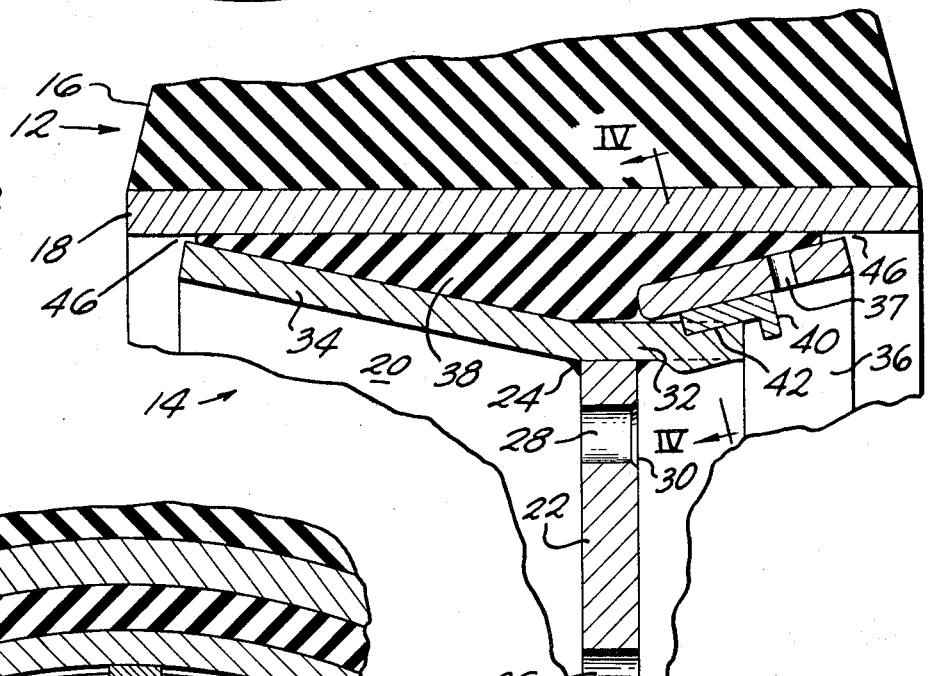
FIG. 2 is a sectional view on line 2—2 of FIG. 1 illustrating the component parts of the wheel in assembled relationship to each other and showing the manner in which the tire is secured to the wheel.
Figure 4:
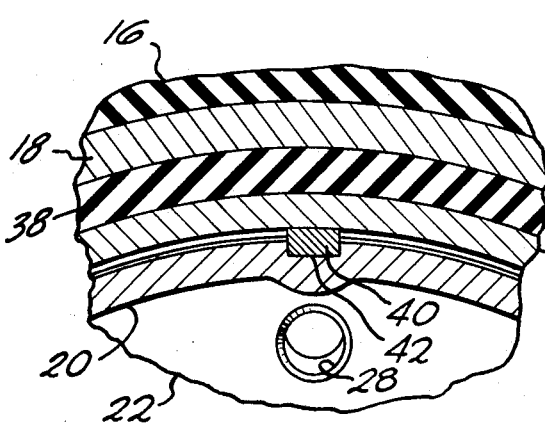
FIG. 4 is a sectional view on line 4—4 of FIG. 2 illustrating a stop between a rim of the wheel and a conical pressure ring.

As shown in FIGS. 2, 3 and 4, standard solid tire 12 has an annular outer cushion 16 of a tough abrasion resistant rubber stock bonded to the outer surface of an annular metal band 18. Wheel 14 has an annular metal rim 20 secured to a metal mounting disk 22 as by welds 24. Disk 22 has a central aperture 26 to provide clearance for the hub of a brake drum and a plurality of circumferentially spaced bolt holes 28 with chamfers 30 for mounting the wheel assembly on a brake drum or the like. Rim 20 has an axially extending cylindrical portion 32 to which disk 22 is attached and a conical or flared portion 34 extending radially outward away from disk 22. A metal conical-shaped ring 36 with its smallest inside diameter slightly larger than the outside diameter of cylindrical portion 32 of rim 20 is designed to slide over the portion 32 and cooperates with rim 20 to form a generally V-shaped channel or groove to receive a pressure pad 38. Conical ring 36 is retained on rim 20 by a plurality of stops or wedges 40 received by a plurality of circumferentially spaced pockets 42 in the outer peripheral surface of cylindrical portion 32 of rim 20. To facilitate mounting and demounting solid tire 12, ring 36 has a plurality of circumferentially spaced holes 37 designed to be aligned with bolt holes 28.

Pressure pad 38 is an annular ring of an elastic rubber or plastic-like material. For example, pressure pad 38 can be molded of an elastic and resilient vulcanized soft rubber stock or any other relatively soft elastic material of similar properties. Pressure pad 38 has a generally isosceles triangular cross section with each side forming an included angle of 10° to 20° with respect to the base. Pressure pad 38 has an outside diameter slightly smaller than the inside diameter of metal band 18 of tire 12 and an inside diameter at the apex (as shown in FIG. 3) slightly larger than the outside diameter of cylindrical portion 32 of rim 20. The outer conical surface of ring 36 and conical portion 34 of rim 20 are inclined at substantially the same angle as the sides of the triangular cross section of pressure pad 38.

FIG. 5 illustrates a wheel 14' for mounting a standard solid tire 12' which is substantially wider than standard tire 12. Wheel 14' is the same as wheel 14 except for a modified rim 20' which has an integral cylindrical portion 44 extending axially from the outer end of conical flared portion 34. Both rims 14 and 14' and pressure ring 36 are constructed so that there is a slight clearance 46 between them and the metal bands of the solid tires. Clearance 46 facilitates the assembly of the rims and rings within the solid tires.

FIG. 6 illustrates the manner in which rim 20 can be formed by a simple press operation. The press ram is designated 48 and the die is designated 50. Die 50 is provided with a conical opening 52 the size of which corresponds to the axial and radial dimensions of the flared portion 34 of the rim 20. A balnk 54 is initially formed as a circumferentially continuous cylinder having an outer diameter corresponding to the maximum outer diameter of rim 20. When blank 54 is forced downwardly through die opening 52, it is tapered as illustrated in broken lines. Wider rim 20' can be formed with the same apparatus by utilizing a blank having a greater axial length. Rim 20' is formed by forcing the longer blank only part way through die 50 to form tubular portion 32 and conical portion 34 with the portion not entering opening 52 providing cylindrical portion 44 of rim 20'.

In mounting standard tire 12 on wheel 14 rim 20 is inserted within steel band 18. As shown in FIG. 3, elastic pressure pad 38 is loosely inserted between steel band 18 and rim 20. Ring 36 is loosely inserted between pad 38 and cylindrical portion 32 of rim 20 and then axially displaced in any suitable manner so that it entraps and compresses pad 38 between rim 20 and steel band 18 (as shown in FIG. 4) to lock the rim to solid tire 12. Entrapping and applying pressure to elastic pad 38 causes it to expand radially into firm frictional engagement with both rim 20 and metal band 18, thereby frictionally securing or locking wheel 14 to standard solid tire 12. As shown in FIG. 3, ring 36 can be axially displaced progressively around its periphery by counterclockwise movement of the free end of a pry bar 62 fulcrumed about an anchoring tool 64 and engaged at the other end in a hole 37 in ring 36. Tool 64 has a hole 68 adjacent one end to receive pry bar 62 and a stop 70 at the other end which extends through a bolt hole 28 and bears on the inboard side of disk 22. Ring 36 is retained in firm engagement with pad 38 by inserting stops 40 into pockets 42 in rim 20 (as shown in FIG. 2) to prevent ring 36 from being axially displaced away from pad 38. Pockets 42 are inclined so that the seating faces of stops 40 are generally parallel to the inner face of compression ring 36. Standard tire 12 is demounted from wheel 14 by using pry bar 62 and anchoring tool 68 to move ring 36 axially inward toward pad 38 so that stops 40 can be removed from pockets 42 thereby progressively releasing the ring so that it can be removed from rim 20 and disengaged from pad 38. This releases the pressure applied to pad 38 so that both the pad and rim 20 can be removed from wheel 12 thereby demounting wheel 14 from solid tire 12.

In this invention mounting a standard tire on a wheel by applying pressure to an elastic pad entrapped therebetween eliminates the need for special presses and other equipment and reduces the maintenance expense and cost of mounting a standard solid tire on a wheel. This arrangement also allows tires to be mounted and demounted by unskilled labor in the shop where the vehicle is used and provides a demountable solid tire and wheel assembly of simple design and economical manufacture and assembly.

I claim:

1. In combination, a solid tire of the type used on industrial vehicle wheels, said tire having a generally cylindrical radially inner surface, a cylindrical metal band bonded to the radially inner surface of the tire, a wheel body having a tire mounting flange secured to and extending around its outer periphery, said tire mounting flange having a generally cylindrical portion to which the outer periphery of the wheel is connected and a radially outwardly flaring conical portion forming an extension of said cylindrical portion at one end thereof, a conical metal ring dimensioned at its smaller end to be received by said cylindrical portion with the larger diameter end of the ring extending axially of the wheel body in a direction opposite to the conical portion of the tire mounting flange and inclined oppositely thereto such that the ring cooperates with the tire mounting flange to define a radially outwardly opening generally V-shaped groove, a compressible annular pad disposed within said groove, said pad having a generally cylindrical radially outer surface engaging the radially inner surface of said metal band, the radially inner surface of said pad engaging the radially outer surfaces of said conical flange portion and said conical ring, said ring being movable on said cylindrical portion of said flange axially toward said conical portion to compress said pad into tight frictional engagement with said band for mounting the tire on the wheel and means for retaining the ring on the cylindrical portion of the flange in a position tightly clamping said pad.

2. The combination set forth in claim 1 wherein said conical ring overlies the cylindrical portion of said flange and extends axially inwardly beyond the end thereof opposite said conical flange portion such as to define a pocket between the radially inner surface of said ring and the radially outer surface of said cylindrical portion, said retaining means being disposed within said pocket to prevent displacement of said ring in a direction tending to relieve the compression of the pad.

3. The combination set forth in claim 1 wherein the apex of said V-shaped groove is defined by said cylindrical portion of the tire mounting flange.

4. The combination set forth in claim 1 wherein the radially inner surface of said pad comprises a pair of oppositely inclined conical faces.

5. The combination set forth in claim 1 wherein said conical ring overlies and cylindrical portion of the flange and extends axially beyond the end thereof opposite said conical flange portion, said retaining means including radially inwardly extending pockets on the radially outer face of said cylindrical portion of the flange and wedges in said pockets engaging the radially inner face of said ring to prevent axially outward displacement of the ring.

6. The combination set forth in claim 5 wherein said pockets have a radially outer wall which is generally parallel to the radially inner face of said conical ring and said wedges having generally parallel radially inner and outer faces engaging the radially outer walls of the pockets and the radially inner face of the ring respectively to prevent said ring from being displaced axially on said cylindrical portion in a direction tending to relieve the compression on said pad.

7. In combination a solid tire of the type used on industrial vehicle wheels, said tire having a generally cylindrical radially inner surface, a cylindrical metal band bonded to the radially inner surface of the tire, a wheel body having a tire mounting flange extending around its outer periphery, said tire mounting flange having a radially outwardly flaring conical portion, a metal ring on said wheel body having a radially outwardly flaring conical portion cooperating with the conical portion of the tire mounting flange to form a radially outwardly opening V-shaped groove, means mounting said ring on the wheel body for axial adjustment toward and away from the conical portion of the tire flange to vary the size of said groove, a compressible annular pad removably disposed in said groove, said pad having a radially inner surface engaging the radially outer conically shaped surface of the tire mounting ring and flange and a generally cylindrical outer face engaging the radially inner face of said metal band, said mounting means being operable to reduce the size of said groove sufficiently to compress said pad and thereby cause said pad to engage said band and said conical surfaces with sufficient friction to prevent relative rotation of the wheel body and tire, said pad forming the sole connection between said wheel body and tire operable to prevent relative rotation between the tire and wheel body, said tire mounting flange having a cylindrically shaped axial extension at the outer end of said conical portion thereof, said tire flange extension having an outer diameter dimensioned to receive said band with only slight clearance therebetween to facilitate assembly thereof, said tire and band having an axial dimension greater than said V-shaped groove and overlying said cylindrical extension.

* * * * *

PO-1050
(5/69)

UNITED STATES PATENT OFFICE
CERTIFICATE OF CORRECTION

Patent No. 3,771,833          Dated November 13, 1973

Inventor(s) Cornelius W. SMITH

It is certified that error appears in the above-identified patent and that said Letters Patent are hereby corrected as shown below:

Column 4, Line 40    Cancel "and" and insert -- said --

Signed and sealed this 16th day of April 1974.

(SEAL)
Attest:

EDWARD M.FLETCHER,JR.          C. MARSHALL DANN
Attesting Officer              Commissioner of Patents